April 22, 1930.  C. G. BELDEN  1,755,977
BRAKE CAM CENTRALIZER
Filed Feb. 1, 1928   2 Sheets-Sheet 1

Inventor
Clements G. Belden
By Blackmore, Spencer & Huth
Attorneys

April 22, 1930. C. G. BELDEN 1,755,977
BRAKE CAM CENTRALIZER
Filed Feb. 1, 1928 2 Sheets-Sheet 2

Inventor
Clements G. Belden
By Blackmore, Spencer & Hich
Attorneys

Patented Apr. 22, 1930

1,755,977

UNITED STATES PATENT OFFICE

CLEMENTS G. BELDEN, OF DETROIT, MICHIGAN, ASSIGNOR TO GENERAL MOTORS CORPORATION, OF DETROIT, MICHIGAN, A CORPORATION OF DELAWARE

BRAKE-CAM CENTRALIZER

Application filed February 1, 1928. Serial No. 251,188.

This invention relates to brake actuating mechanism and is intended particularly for use as an actuating mechanism for internal brakes as used on the wheels of motor vehicles.

The object of the invention is to provide means associated with the brake actuating mechanism to divide equally the pressure applied to the brakes used. As a further object, the invention aims to insure a centralized positioning instrumentality to prevent brake drag. As a further object, there is included a convenient means for adjustment to make correction for unequal lining wear. Other objects and advantages will be understood from the reading of the following specification and an examination of the accompanying drawing.

Figure 1:
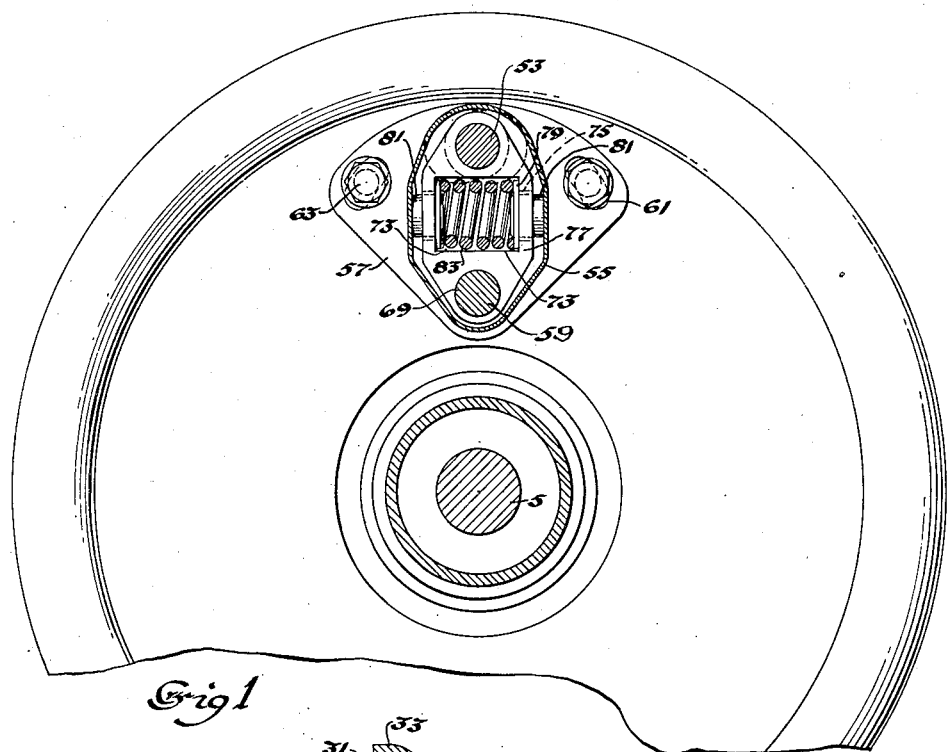
Figure 1 is a longitudinal vertical sectional view through the improved brake actuating means showing the backing plate in elevation.
Figure 2:
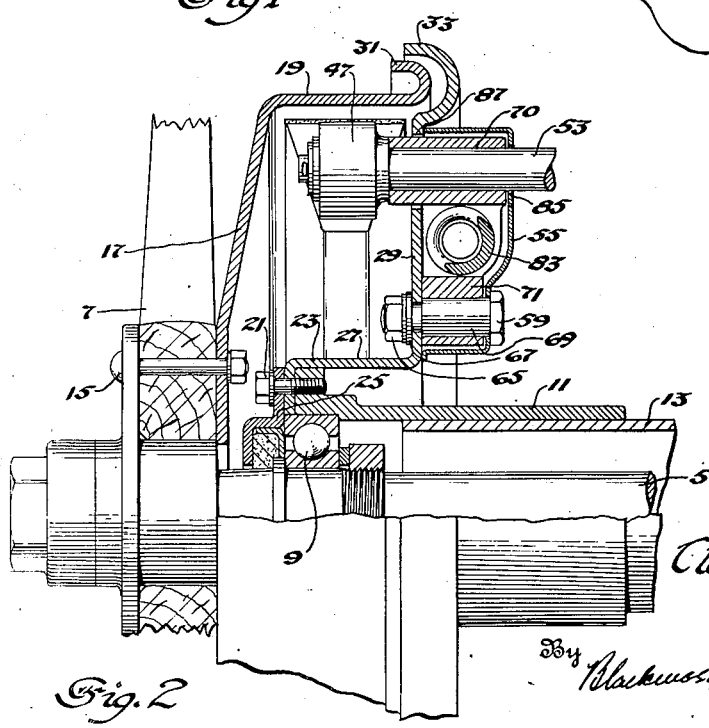
Figure 2 is a transverse vertical section through the drum and actuating mechanism.

Referring by reference characters to the drawing, numeral 5 represents a vehicle axle. The axle 5 in the drawing is a rear driving axle and has secured thereto in any preferred way a driving wheel 7. An anti-friction bearing 9 rotatably supports the live axle within a tubular extension 11 carried by the axle housing 13. Wheel 7 has secured to its inner surface by fastening means 15 a brake drum 17, the drum being formed with an annular flange 19 for frictional engagement with suitable brake means, as is usual in motor vehicles. Fastening means 21 are used to secure a plate 23, the dust plate or backing plate, to the axle housing or its extension 11, as shown. Angular plate 25 may serve as a bearing race retainer and be held in position by the same fastening means 21.

The backing plate 23 is preferably shaped as shown having adjacent its point of attachment to the sleeve 11, an annular ring portion 27 which terminates inwardly in a disk portion 29 serving to close the drum opening. The adjacent peripheral parts of the drum and backing plate are preferably outwardly bent as at 31 and 33 to better protect the drum enclosure from foreign matter. The construction just described is the arrangement for a rear wheel. It will be understood that in the case of a front wheel, the backing plate will be secured to the steering knuckle which is to be swivelled to the front axle this being the usual construction with front wheel brakes.

Figure 3:
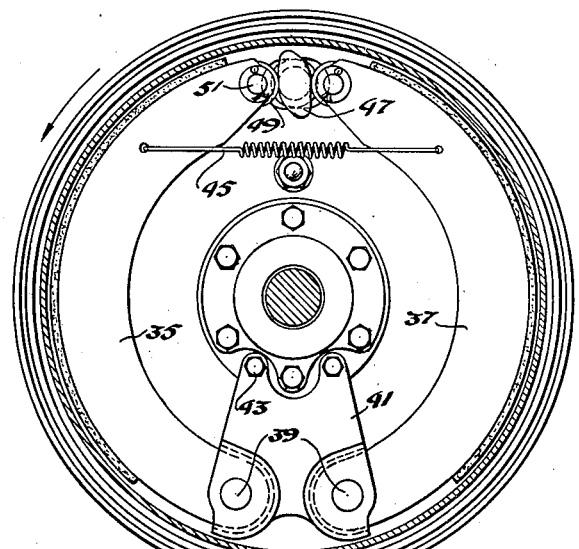
Figure 3 is a vertical longitudinal section through the drum showing the shoes and actuating means in elevation.

The drum enclosure constituted by the drum and the backing plate houses the brake mechanism which is to be expanded into frictional engagement with the inner periphery of the drum to check or stop the rotation of the wheel. As shown in Figure 3, the brake mechanism may consist of two shoes 35 and 37 anchored by anchor pins 39 carried by the backing plate and by a plate 41 within the enclosure, spaced from the backing plate and secured by two or more fastening bolts 43 to the backing plate and axle housing. The spaced relation of the backing plate and plate 41 affords a straddle mounting for the anchor pins 39. Between and connected to the shoes 35 and 37, and preferably in the vicinity of the actuating means is a spring 45 to withdraw the shoes from the drum toward each other and against the actuating means when the brake is released.

The brake shoes may be actuated by a double cam 47 engaging rollers 49, one on the end of each shoe and mounted on a pin 51 carried by the shoe. This cam is rigid with a shaft 53.

In conventional arrangements, a camshaft corresponding to shaft 53 is rotatably journalled in a backing plate and suitable means is provided such as an arm on the camshaft and linkage between the arm and the pedal for rocking the shaft and the cam to expand the shoes against the drum. This invention is not concerned with the means by which the pedal is connected to the camshaft, nor to the kind of shoes which are actuated by the cam. Further illustration or description of this matter is therefore omitted. The invention is concerned with a movable mounting for the cam and its shaft relative to the fixed backing plate.

It is well understood that when brake shoes are expanded against the drum periphery unequal lining wear and the direction of rotation of the drum must be taken into consideration in determining the effect of each shoe in retarding motion. If the arrow in Figure 3 represents the direction of wheel and drum rotation, it is well understood that the rotating drum tends to swing shoe 35 about its pivot anchor 39 into drum engagement while the same rotary movement of the drum tends to swing shoe 37 in the same direction, away from the drum, and to thereby lessen the friction between itself and the drum. The action of the rotating drum upon the leading shoe 35 is commonly termed self-actuation, and it may be, and frequently is, a force large enough to materially lessen the pedal pressure required in applying the brake. The advantage derived from this force is, however, lost if the camshaft has a fixed journal in the backing plate because, although the leading shoe tends to supplement pedal pressure, the trailing shoe 37 is pressed by the rotating drum against the cam in a direction the opposite of the rotation imparted to it by the pedal. This action is well understood and in order to take advantage of self-actuation, and to correct for unequal lining wear various expedients have been resorted to. Among such expedients may be mentioned a movable relation between the cam and its shaft and a movable mounting of the camshaft itself in the backing plate. Such expedients are effective in allowing the cam to follow up the leading shoe and to exert its applied force equally between the two shoes. These expedients do not operate without a certain disadvantage however. Although the cam moves bodily in a circumferential direction to afford the advantages mentioned there is no positive force to restore the cam to its original central position after being displaced therefrom under the influence of the rotating drum. Furthermore, in some constructions frictional retardation has been employed to prevent the free movement of the cam and this very frictional means, while offering resistance to the circumferential movement of the cam also offers resistance to the desired return movement of the cam upon brake release. The releasing spring connecting the shoes may restore the shoes and cam to their relative released position, but this spring does not restore the two shoes and the cam to their neutral released position from which they were bodily moved by the self-actuation due to drum rotation. Furthermore, if the forward motion of the vehicle be only checked, not entirely stopped, the self-actuating force persists after the pedal pressure is released, thereby tending to hold the forward shoe against the drum and to cause the brake to drag. The whole assembly, both shoes and cam, will then be positioned forwardly of their normal position. By my invention, full advantage of self-actuation and low pedal pressure is secured but with no danger of brake drag after release owing to the presence of a novel centralizing device.

At 55 is a hollow casing formed with flanges 57 overlying the backing plate 23. Casing 55 is pivoted by a pivot bolt 59 to the backing plate. Arc-shaped slots 61 are formed in the flanges 57, struck from bolt 59 as a center and bolts 63 pass through the backing plate and through said slots and are held in position by nuts 65 and lock washers 67 whereby the casing 55 is fixedly but adjustably held to the backing plate. An enlarged part 69 surrounds bolt 59 and affords a pivot bearing for an inner lever 71 swinging about the bolt 59 as a center. Adjacent the end of lever 71 remote from its pivot it is apertured as at 70 for the rotatable support of camshaft 53. The lever 71 is thus mounted for swinging within casing 55, and as it swings it carries the camshaft 53 and the cam 47 substantially circumferentially. It will be understood that this bodily movement of the cam and camshaft is the means referred to above to permit self-actuation to assist pedal pressure.

It remains to be explained how my invention restores the cam to central position after brake release. Between the cam carrying part of the lever and the pivot end, the lever is formed with a central opening 73 communicating with which are circular openings 75 through the side walls 77 of the lever. Within the central opening 73 are discs 79, each disc positioned adjacent an opening 75. The discs are formed with cylindrical extensions 81 extending through openings 75 and engaging the walls of the casing, as shown in Figure 1. Between discs 79 is a coil spring 83. Spring 83 becomes a centralizing device to restore to central position relative to casing 55 the lever and the camshaft. If, in applying brake, lever 71 swings about its pivot 59 the leading disc 79 being in abutment with the casing wall, through the engagement of its cylindrical extension 81 therewith, serves as a fixed abutment for spring 83. The trailing wall 77 of the lever swings forwardly and through the instrumentality of disc 79 compresses the spring against the other disc which has become a fixed abutment as stated. The spring mounting is symmetrical, the spring is double acting, and the resistance is afforded whichever way the lever swings about its pivot. When the brake is released, spring 45 draws the shoes together upon the cam, and if by chance lever 71 has been swung in the casing due to self-actuation, spring 83 restores the lever and the camshaft and both shoes to a central position relative to casing 55 and the backing plate. In this way, dragging of the self-actuated shoe is avoided. In a compact arrangement employing but a single double acting spring, full advantage may thus be taken of self-actuation to lessen the pedal pressure, and this with no possibility of brake drag.

To correct unequal lining wear, after long use it is possible to loosen nuts 65 and swing the housing 55 with its flanges 57 relative to the backing plate to thereby obtain a new position for the camshaft in which new position the clearance between each shoe and the drum will be the same. This is a manual adjustment and is conveniently associated structurally with the provision for self-actuation. As a convenient method of making the adjustment, the brakes may be applied by the pedal with the vehicle at rest, the nuts 65 loosened whereupon the reaction of spring 83 upon housing 55 will automatically determine the correct position for said housing. The nuts 65 may then be tightened and the pedal pressure released.

It will be understood that the opening 85 in the wall of the casing 55 through which the camshaft passes must be sufficiently long to permit the swinging of the lever 71 relative to the casing. It will also be understood that opening 87 in the backing plate must be somewhat longer than opening 85 in order to accommodate not only the movement of the shaft relative to the casing, but of the casing and shaft as these parts are together adjusted to equalize clearance by movement of the casing about pivot 59 and relative to the backing plate.

Figure 4:
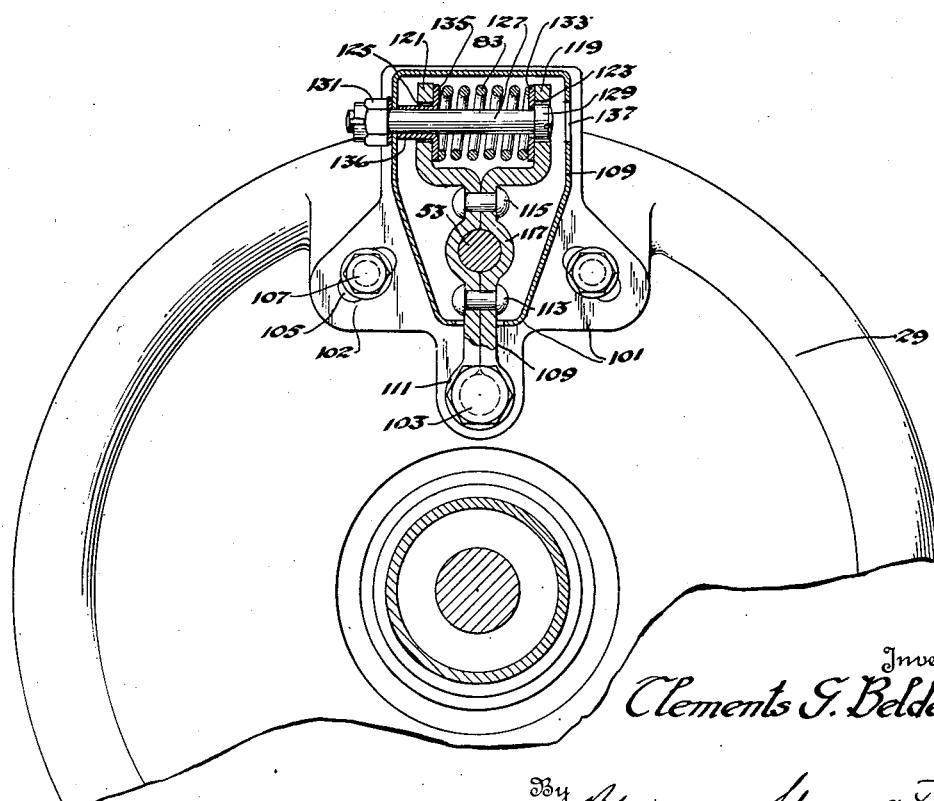
Figure 4 is a view corresponding to Figure 1 but showing a modified form in which the invention may be embodied.

Figure 4 is to illustrate a second form in which the invention may be embodied. In this form, plate 101 is pivoted to the backing plate 29 by pivot 103. Plate 101 has flanges 102 with slots 105 through which pass bolts 107, this arrangement permitting manual adjustment to equalize shoe clearance as in the form previously described. Plate 101 is formed with a recess or casing 109. On pivot 103 is also pivoted a lever 109. This lever may be economically formed by bending a plate to form an eye 111 surrounding pivot 103. Near the eye a rivet 113 secures the two sides of the plate together. Between the rivet 113 and a similar rivet 115, the material of each side is formed as a half bearing 117, the two half bearings to serve as a journal for the camshaft 53. Beyond the rivet 115 the side plates are formed with opposed faces 119 and 121, each face being apertured as at 123 and 125. A bolt 127 has its head 129 positioned within opening 123 and extends through opening 125 and through a registering opening in the casing wall. A nut 131 is positioned on the bolt outside the casing wall. A disc 133 surrounds the bolt within face 119 and a disc 135 surrounds the bolt adjacent face 121. The latter disc 135 has a sleeve 136 extending through the opening in the face 121, the end of the sleeve being in abutting relation with the wall of the casing. The casing wall adjacent the head of the bolt may have an opening 137 to afford access to the bolt to conveniently assemble and adjust the same. In this form of the invention the disc 135 serves as an abutment for spring 83 when the lever rotates in one direction. As a spring abutment for the opposite direction of rotation of the lever the disc 133 held by the bolt head 129 is used. The operation of this embodiment of the invention is substantially the same as that already described and will be understood without further description.

It will be noted that the tendency of road shocks to move the floating cam and cause shoe and drum engagement is very much more effectively resisted with my single spring than would be possible with a cam held in balanced position between opposed springs. In the latter case, considerable cam movement may occur before the resistance is material. In the case of my single spring, the resistance offered is unopposed and the spring is capable of preventing drum and shoe contact as the result of road shocks.

I claim:

1. Operating means for a brake comprising a drum, a brake to engage the drum, said operating means comprising a brake actuating member to move said brake into engagement with said drum, means to mount said brake actuating member to permit its bodily movement, mechanism comprising a single spring to restore said brake actuating member to the position from which it was bodily moved in applying the brake.

2. In a brake, cooperating relatively movable frictionally engageable members, one of which is carried by a part, the motion of which is to be checked, actuating mechanism to move at least one of said members to effect the frictional engagement of said members, means to restore said movable brake member to its initial position relative to the actuating mechanism, a single yielding means resiliently resisting the combined movement of said movable friction member and said actuating mechanism.

3. In a brake, cooperating relatively movable frictionally engageable members, one of which is carried by a part, the motion of which is to be checked, actuating mechanism to move at least one of said members to effect the frictional engagement of said members, means to restore said movable brake member to its initial position relative to the actuating mechanism, a single yielding means resiliently resisting the combined movement of said movable friction member and said actuating mechanism, an abutment for said yielding means movable to load said spring under the influence of said combined movement.

4. In a brake, cooperating relatively movable frictionally engageable members, one of which is carried by a part, the motion of which is to be checked, actuating mechanism to move at least one of said members to effect the frictional engagement of said members, means to restore said movable brake to its initial position relative to the actuating mechanism, a single yielding means resiliently resisting the combined movement of said movable friction member and said actuating mechanism, a plurality of abutments engaging the ends of said yielding means, one of said abutments movable to load said spring under the influence of said combined movement.

5. In a brake, a drum, a fixed support adjacent said drum, a brake member anchored to said fixed support and movable to engage the drum, carrying means movably mounted relative to said support, actuating means movably mounted relative to said carrying means and operative to move said brake member into frictional engagement with said drum, yielding means to restore said brake member relative to said actuating means, and a single yielding means to restore said carrying means to a predetermined position relative to the fixed support regardless of its direction of movement.

6. The invention defined by claim 5, said last-named means operable in either direction of rotation of said drum.

7. In a brake, a fixed member, frictionally engaging members one of which is movable into engagement with the other, actuating means movable relative to said movable frictionally engaging member to effect the engagement of said frictionally engaging members, yielding means to restore the initial relation of the movable friction member and the actuating means, said movably friction member and actuating means movable as a unit to accommodate self-actuation of said brake, a single independent yielding means to restore said unit to its normal position.

8. The invention defined by claim 7, together with movable abutments at the ends of said single independent yielding means, said abutments normally engaging said fixed member.

9. In a brake, friction means, a floating actuating means therefor, a single centralizing spring to restore said friction means together with the actuating means to their normal positions.

10. The invention defined by claim 9, said centralizing spring being positioned between movable abutments.

11. In a brake, a first brake member, friction means to engage the same, actuating means for said friction means, means under manual control to move said actuating means relative to said friction means in applying the brake, said actuating means and friction means movable together under the influence of the movement of said first brake member, yielding means to restore the first said relative movement and independent yielding means to restore said second combined movement, the said last-mentioned yielding means constituted by a spring with movable abutments at each end, a fixed support, said spring abutments normally engaging said support, one of said abutments movable to compress said spring against the other abutment and fixed support in each direction of rotation of the first brake member.

12. In combination, a drum, a backing plate, friction members pivotally anchored to said backing plate, actuating means carried by the backing plate and positioned near the adjacent ends of said friction members to expand the same against the drum, yielding means to restore said friction members and actuating means to their normal relative position, a mounting for said actuating means whereby said actuating means has a bodily movement together with the friction members, and a second single yielding member to yield under the influence of said bodily movement in either direction and thereafter to restore said bodily movable parts to initial position.

13. The invention defined by claim 12, said mounting comprising a lever pivoted to the backing plate and said actuating means rotatably mounted in said lever, said lever having an opening, the last-mentioned yielding means positioned in said opening, abutments movable relative to said lever and terminally engaging said backing plate and yielding means.

14. In combination, a brake drum, a plate fixed in position relative to said drum, friction members pivotally anchored to said plate, said backing plate including a separable plate adjustable relative to the major portion thereof, a swinging member carried by said backing plate, an actuating member rotatably mounted in said swinging member, yielding means to effect a predetermined relative position between said swinging member and separable plate.

15. The invention defined by claim 14, the pivot axis of said swinging member being also the axial center of adjustment of the separable plate.

16. In a brake, a drum, a fixed plate, friction members pivoted thereto for engagement with the drum, a pivot pin carried by the fixed plate near the adjacent ends of the friction members, a separable plate mounted to swing on said fixed plate, a lever rockable on the same pin and movable relative to said separable plate, a brake actuating means carried by said lever and yielding means between said lever and separable plate maintaining a normal fixed relation therebetween.

17. In a brake, a combined adjusting means and centralizing means, comprising a fixed plate, a pivot pin therein, a separable plate rotatable on said pivot pin and means to fix said separable plate in adjusted position, a centralizing lever pivoted on said pivot pin, actuating means carried by said lever, a centralizing spring normally positioning said lever in an intermediate position relative to said separable plate and permitting movement of said lever and actuating means in either direction about said pivot.

18. The invention set forth in claim 17, said separable plate including a housing embracing said lever, said centralizing spring positioned within said housing, movable spring abutments engaging opposite ends of said spring and terminally normally engaging the walls of said housing.

In testimony whereof I affix my signature.

CLEMENTS G. BELDEN.